United States Patent
Brown

[11] Patent Number: 6,006,851
[45] Date of Patent: Dec. 28, 1999

[54] VEHICLE STEERING WHEEL ROTATION RESTRAINING APPARATUS

[76] Inventor: Lawrence A. Brown, 17233 San Fernando Mission Boulevard, Granada Hills, Calif. 91344

[21] Appl. No.: 08/897,606

[22] Filed: Jul. 21, 1997

[51] Int. Cl.$^6$ .................................................. B60R 25/00
[52] U.S. Cl. ................................ 180/287; 70/209; 70/226
[58] Field of Search .................................. 180/287, 289; 70/209, 226, 225, 237, 252; 307/10.2

[56] References Cited

U.S. PATENT DOCUMENTS

| | | | |
|---|---|---|---|
| 4,958,699 | 9/1990 | Tchilinguirian | 180/287 |
| 5,031,429 | 7/1991 | Wang | 70/209 |
| 5,409,077 | 4/1995 | Ball | 180/287 |
| 5,557,957 | 9/1996 | Wyman | 70/209 |
| 5,600,979 | 2/1997 | Winner et al. | 70/252 |

*Primary Examiner*—Christopher P. Ellis
*Attorney, Agent, or Firm*—Robert Schaap

[57] ABSTRACT

A vehicle steering wheel rotation restraining apparatus which comprises a restraining arm located within the hub of a steering wheel and which is extendable to a steering wheel rotation restraining position outwardly of the steering wheel and retractable within the steering wheel to allow freedom of use of the steering wheel. The restraining apparatus is provided with a lock mechanism on or associated with the exterior surface of the hub for a user to release or lock the restraining arm. The restraining arm is normally located within the hub of the steering wheel and upon opening of the lock device, the restraining arm will automatically extend outwardly to its full steering wheel rotation restraining position. In this latter position, the arm is sufficient in length to preclude any significant turning of the steering wheel since it will impact with a rigid portion of the vehicle or the legs of the vehicle driver. Thus, the restraining arm is easy to use. When the driver of the vehicle again wishes to use the vehicle, he or she can merely push the arm back into the hub and lock the restraining arm in its retracted position in the steering wheel. In like manner, when the driver of the vehicles wishes to reduce the possibility of vehicle theft, he or she can merely release the lock mechanism and allow the restraining arm to extend to its full rotation restraining position.

23 Claims, 5 Drawing Sheets

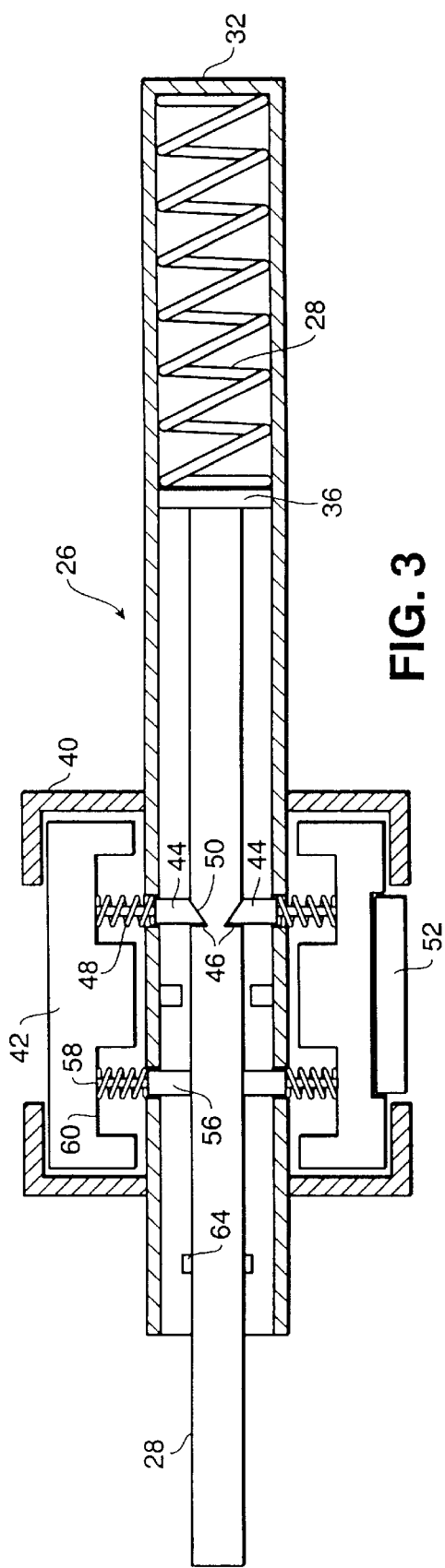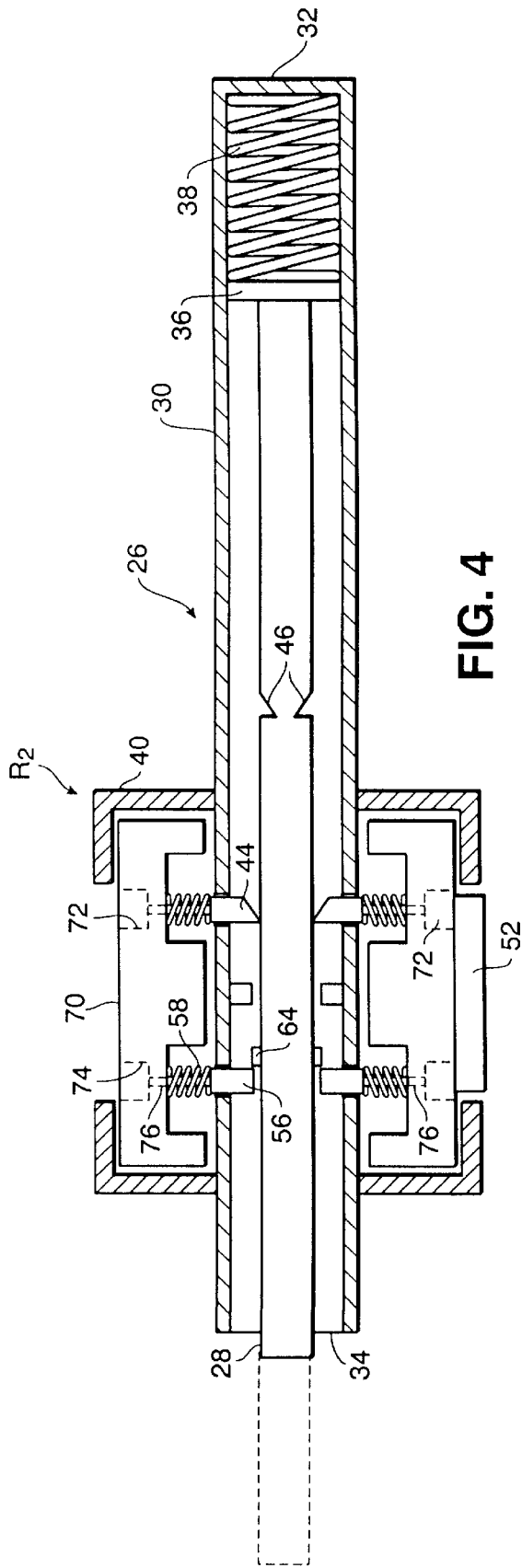

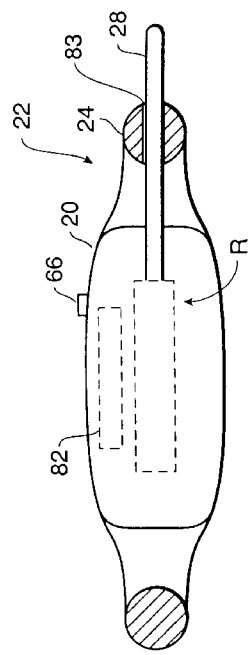
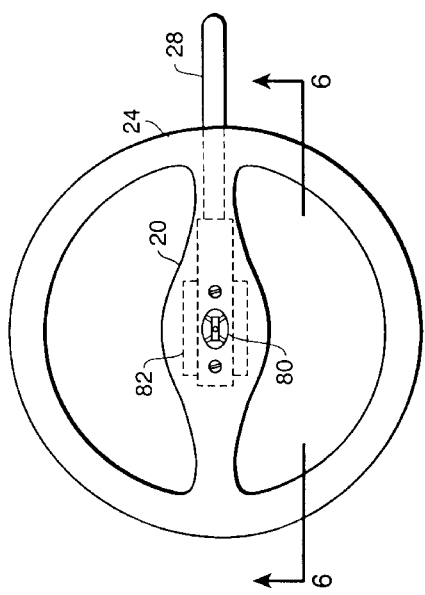
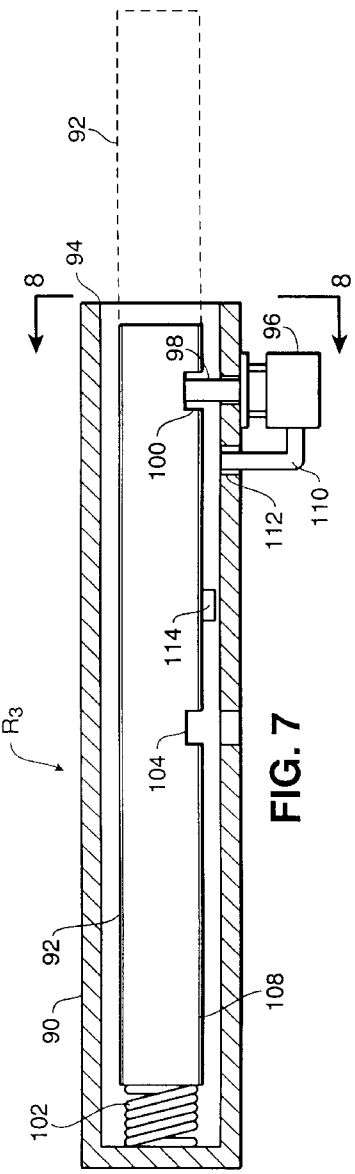
FIG. 6
FIG. 5
FIG. 7

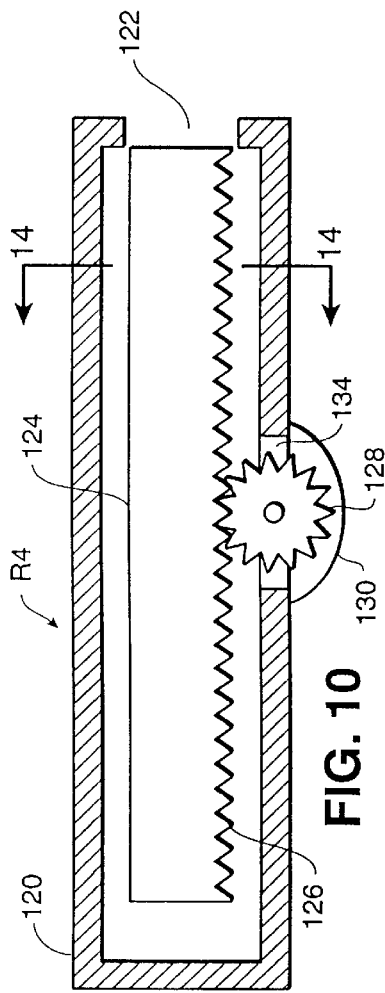
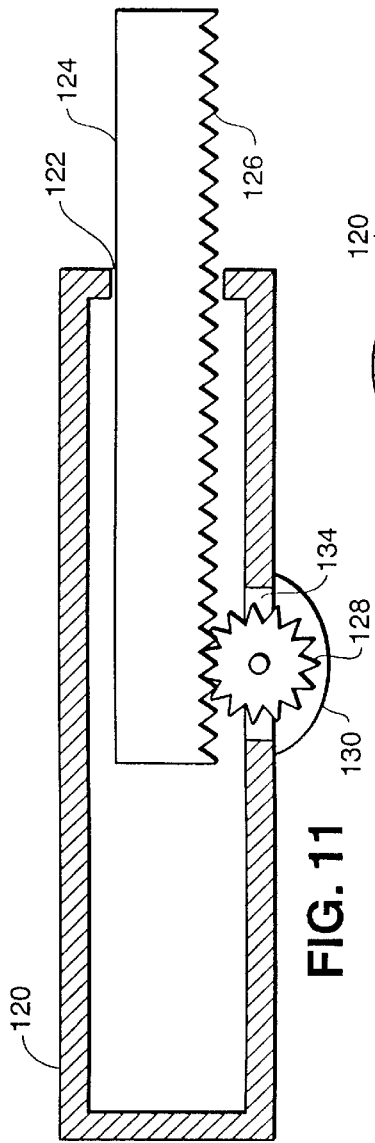
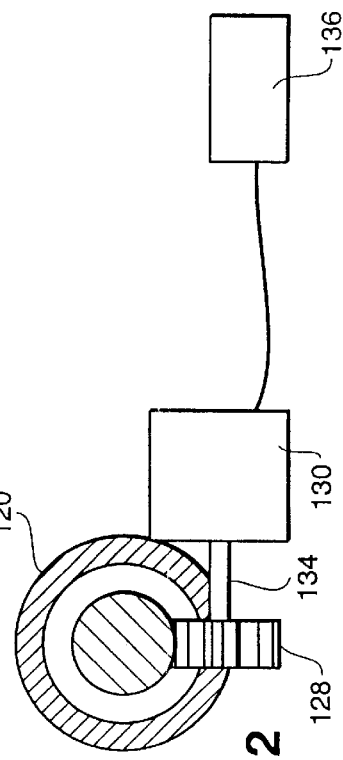
FIG. 10
FIG. 11
FIG. 12

VEHICLE STEERING WHEEL ROTATION RESTRAINING APPARATUS

BACKGROUND OF THE INVENTION

1. Field of the Invention

This invention relates in general to certain new and useful improvements in vehicle steering wheel rotation restraining apparatus and more particularly to a vehicle steering wheel rotation restraining apparatus of the type which employs a restraining arm extendable out of the hub of a steering wheel for use and back into the hub of the steering wheel when the restraining arm is not employed.

2. Brief Description of the Related Art

The increased incidence of automobile theft in recent years has led to a variety of anti-theft devices specifically designed for use with automotive vehicles. Most of these devices are usually readily circumvented by the experienced automotive vehicle thief. As a simple example, many automotive vehicle thieves are quite familiar with the disarming of which alarm systems and the like.

One effective automotive anti-theft device for use with automotive vehicles relies upon the use of an elongate rod which is physically clamped to the steering wheel when the vehicle is not in use. This rod has a length greater than the overall diameter of the steering wheel such that one or both of the opposite ends of the rod extends beyond the rim of the steering wheel. In this way, a driver is precluded from driving the vehicle with the rod clamped in place due to the fact that the outer ends of the rod will engage a portion of the vehicle or the legs of the driver and preclude turning of the steering wheel beyond a very limited radius of rotation.

While the rod or so-called "Club" is effective for its intended purpose, it is frequently not used due to the time and difficulty in mounting this device onto the steering wheel. When a driver stops a vehicle for a short period of time, as for example, to enter into a quick purchase location or so-called "quick shop", the driver will often intentionally avoid the use of this locking device because of the amount of time and difficulty required to mount the same onto the steering wheel and to again remove the same from the steering wheel.

Although a driver of a vehicle who may have the restraining arm device available does not use that device because of an intentional quick stop, it is frequently locations such as parking lots where vehicles are stolen. Consequently, the driver who assumes that the vehicle will be relatively safe because of only a short period where it is unattended, often misleads himself or herself. Hence, the device is unused where and when needed.

The use of the restraining arm device also becomes a serious problem with a woman who may be attending small children, and particularly infants who are being carried. As a simple example, the woman carrying an infant is ill-equipped to be able to mount the restraining arm device onto the vehicle steering wheel and again remove the restraining arm device when it becomes unused. With many drivers, after a period of time, due to the difficulty in use of this device, it frequently becomes unused and also not even carried in the vehicle.

Thus, there has been a need for an effective steering wheel locking device which can be activated and employed upon a simple opening of a lock mechanism and which can be deactivated and removed from use also upon a simple actuation of a locking mechanism.

OBJECTS OF THE INVENTION

It is, therefore, one of the primary objects of the present invention to provide a vehicle steering wheel rotation restraining apparatus which can be easily opened and actuated for use by mere opening of a lock mechanism and which can be retracted by simple operator manipulation.

It is another object of the present invention to provide a vehicle steering wheel rotation restraining apparatus which has a rotation restraining arm with a length extending beyond the diameter of the steering wheel so as to preclude turning of the steering wheel beyond a very limited degree of rotation.

It is a further object of the present invention to provide a vehicle steering wheel rotation restraining apparatus of the type stated which can be easily activated and put in use and which can be easily and very quickly retracted from use.

It is also an object of the present invention to provide a vehicle steering wheel rotation restraining apparatus of the type stated which can be constructed at a relatively low cost and which is highly effective in operation.

It is an additional object of the present invention to provide a vehicle steering wheel rotation restraining apparatus of the type stated which is capable of being used with a wide variety of steering wheels having different constructions and differing sizes.

It is another salient object of the present invention to provide a method of extending a steering wheel rotation restraining arm from a steering wheel to preclude theft of the vehicle and causing a retracting movement of that restraining arm when the latter is not in use.

With the above another objects in view, my invention resides in a normal features of form, construction, arrangement and combination of parts presently described and pointed out in the claims.

SUMMARY OF THE INVENTION

The present invention relates in general terms to a vehicle steering wheel rotation restraining apparatus which includes a restraining an arm located in the hub of a steering wheel of the vehicle and which can be extended from that hub to preclude rotation of the steering wheel and retracted back into a nested position in the hub.

In accordance with the present invention, the restraining arm which is a relatively rigid arm is stored within the hub of a vehicle steering wheel. In most vehicles, the steering wheel includes an outer ring along with a central section, often referred to as a "hub" which mounts on to the upper end of the steering column. That hub is frequently a solid member extending diametrically across a steering wheel ring.

The restraining arm of the present invention is stored within that steering wheel hub. A locking mechanism is provided such that when released, the restraining arm can be extended outwardly from the steering hub and to a position where it would engage a fixed structure or otherwise the legs of the driver if the steering wheel is rotated beyond a very limited rotation. This would in effect, preclude theft of the vehicle.

When a user of a vehicle is desirous of driving the vehicle, that user can actuate the locking mechanism to cause a retraction of the restraining arm back into the hub of the steering wheel. This will then permit complete freedom of rotation of the steering wheel much in the same manner as if the restraining arm were not located within the steering wheel.

In a more preferred embodiment of the present invention, the extendable rod of this rotation restraining apparatus, is spring biased so that when the locking mechanism is released or opened, the elongate rod will automatically extend outwardly from the steering wheel and lock in the extended position and thereby preclude any significant rotation of the steering wheel. The rod is designed to extend outwardly by spring pressure for only a relatively short distance so as to avoid hard impact with an occupant of the vehicle. Thus, for example, the rod will extend outwardly for about six inches where it can thereupon be pulled manually to a fully extended position.

The rotation restraining apparatus is also provided with a detent arrangement which engages the rod in the extended position and precludes retraction back into the hub of the vehicle until the locking mechanism is actuated. Further, the rotation restraining apparatus, also includes restraining members which engage the rod and hold the same within the stored or nested position in the steering wheel when the rod has been retracted to the stored or nested position within the steering wheel.

The rotation restraining apparatus of the present invention is provided in one embodiment as a fully mechanically operable apparatus and also in another embodiment as an electromechanically operable apparatus. The mechanically operable apparatus is typically referred to and is actually operable as a manual system. In this respect, after the restraining rod is extended a short distance, the user will pull the restraining rod to a fully extended position, and in returning the rod to its nested position, the user must fully push the rod back into the hub of the steering wheel. In the manually operable apparatus, spring biased locks and stops are employed in response to operation of a lock mechanism.

The electromechanically operable apparatus is typically referred to as a semi-automatic device. In this case, mechanically operable components are used along with electrically operated stops and locks which are employed in response to actuation of a lock mechanism.

The present invention also provides a fully automatic apparatus, and that is one which is fully electrically operated for causing movement of the steering wheel rotation restraining rod. The fully automatically operable apparatus can eliminate many of the mechanical components employed with the apparatus, and can primarily rely upon a rack and pinion drive, or similar type of drive mechanism.

This invention possesses many other advantages and has other purposes which will be made more fully apparent from a consideration of the forms in which it may be embodied. A few of the forms of this vehicle steering wheel rotation restraining apparatus, and the associated method is more fully described in the following detailed description and more fully illustrated in the accompanying drawings. However, it is to be understood that these drawings and the following detailed description are set forth for purposes of illustrating and describing the general principles of the invention and are not to be taken in a limiting sense.

BRIEF DESCRIPTION OF THE DRAWINGS

Having thus described the invention, reference will now be made to the accompanying drawings in which

Figure 1:
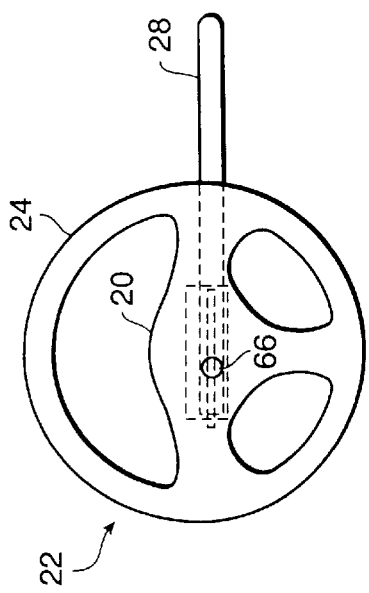
Figure 2:
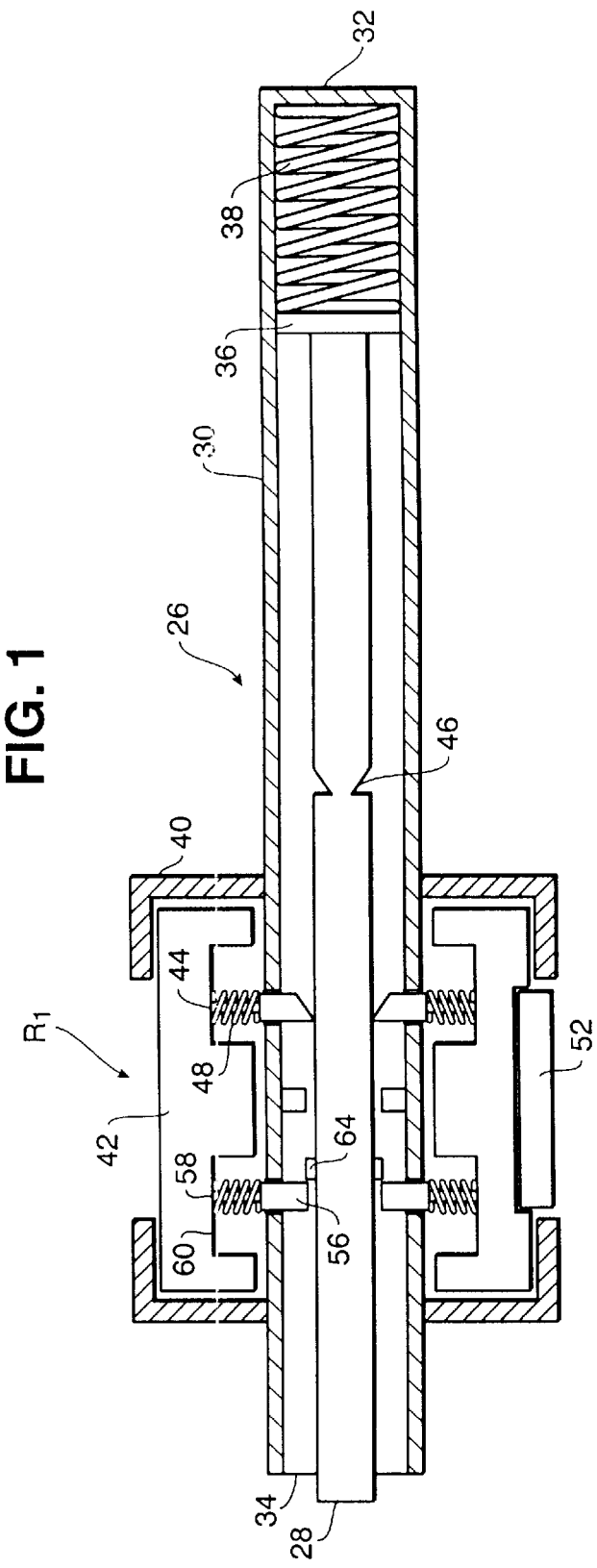
Figure 8:
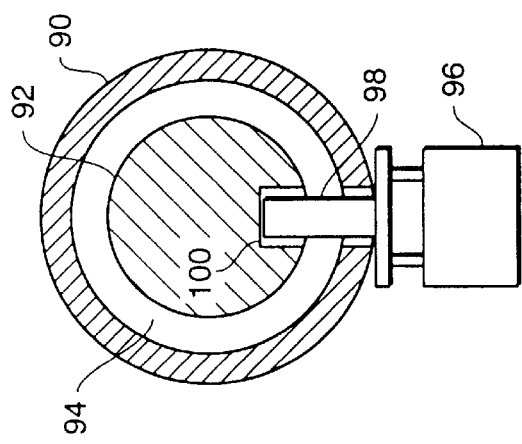
Figure 9:
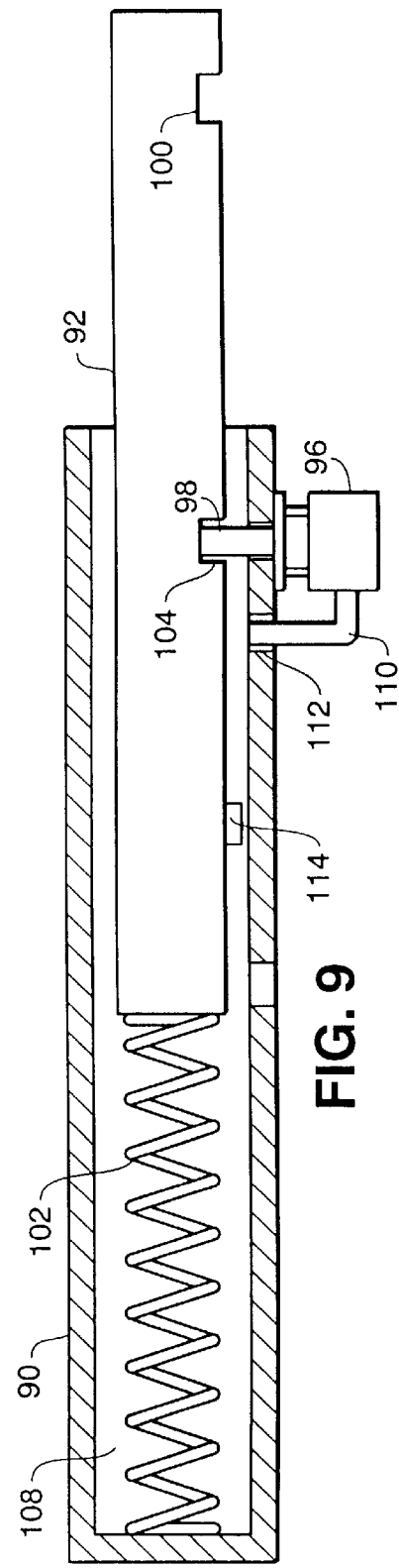

FIG. 1 is a perspective view of a vehicle steering wheel having the rotation restraining apparatus of the present invention incorporated therein;

FIG. 2 is a sectional view showing the rotation restraining apparatus of the present invention with the restraining arm in a nested position;

FIG. 3 is vertical sectional view of the rotation restraining apparatus, similar to FIG. 2, but showing the restraining arm in a fully extended position;

FIG. 4 is a vertical sectional view of the rotation restraining apparatus, similar to FIGS. 2 and 3 and showing an electromechanically operable system for operating locks and stops;

FIG. 5 is an elevational view of an underside of a steering wheel on a vehicle steering post and incorporating the rotation restraining apparatus of the present invention therein;

FIG. 6 is a plan view taken along line 6—6 of FIG. 5;

FIG. 7 is a sectional view showing a modified form of the rotation restraining apparatus which utilizes an electrically operable circuit arrangement;

FIG. 8 is a sectional view taken along line 8—8 of FIG. 7;

FIG. 9 is a sectional view, similar to FIG. 7, and showing the embodiment of the rotation restraining apparatus of FIG. 7 with the restraining arm in an extended position;

FIG. 10 is a sectional view, showing another modified form of rotation restraining apparatus which is typically referred to as a fully automatic apparatus;

FIG. 11 is a sectional view, similar to FIG. 10, but showing a restraining arm in an extended position; and FIG. 12 is an end elevational view of the rotation restraining apparatus of FIGS. 10 and 11, taken substantially along the plane of line 12—12 of FIG. 10.

DETAILED DESCRIPTION OF A PREFERRED EMBODIMENT

Referring now in more detail and by reference characters to the drawings, R designates a vehicle steering wheel rotation restraining apparatus, which is mounted within the hub 20 of a conventional steering wheel 22. Generally, most steering wheels 22 include an outer steering wheel ring 24 and one or more members extending across the ring 24, such as the hub 20, in the manner as shown in FIG. 1 of the drawings. The hub 20 is typically arranged for mounting to the steering column.

The vehicle steering wheel rotation restraining apparatus of the invention may have the major components thereof literally mounted within the hub 20 of the steering wheel, also in the manner as somewhat shown in FIG. 1 of the drawings. In this case, the vehicle steering wheel rotation restraining apparatus may adopt any of three major different embodiments, and which are referred to herein as the manual apparatus, the semi-automatic apparatus, and the fully automatic apparatus.

Turning now to FIGS. 2 and 3 of the drawings, there is illustrated a mechanically operable vehicle steering wheel rotation restraining apparatus $R_1$, which includes an outer generally cylindrically shaped restraining rod retaining housing 26, which shiftably holds a rotation restraining rod 28. The housing 26 includes a cylindrically shaped side wall 30 and an enclosing end wall 32 at one end, with an opposite open end 34. By reference to FIGS. 2 and 3, it can be seen that the rotation restraining rod 28 is capable of exiting the open end 34 and extending outwardly from the housing to the position as shown in FIG. 3.

The rotation restraining rod 28 is provided at one end, that is the end in proximity to the end wall 32, with a biasing plate 36. Captured between the biasing plate 36 and the end wall 32 is a compression spring 38. Thus, the compression spring 38 biases the rotation restraining rod 28 to the outer position, as shown in FIG. 3 of the drawing, when the latter is not restrained against extension to that fully extended position.

It should be understood that the rotation restraining rod 28 in the preferred embodiment, is cylindrically shaped and hence, the housing 26 is also generally cylindrically shaped. However, the rotation restraining rod 28 and hence the rotation restraining rod housing 26, can be made of other cross-sectional shapes, such as a rectangular cross-sectional shape, or the like.

When the rotation restraining rod 28 is extended to the fully extended position, substantially as shown in FIG. 1, it can be seen that rotation of the steering wheel 22 is prevented except through a very short accurate distance. Hence, a thief or other individual having unauthorized access to the vehicle may attempt to wire the engine to start without an ignition key, although the thief or other unauthorized individual would not be able to negotiate the turning of the vehicle beyond very broad turns. The rotation restraining rod 28 cannot be pushed back into the hub 20 without unlocking the apparatus, in a manner as hereinafter described.

The rotation restraining apparatus $R_1$ also comprises a lock mechanism housing 40, which is mounted on and extends about the rotation restraining rod housing 26. Thus, and in this preferred embodiment, the lock mechanism housing 40 is also cylindrically shaped. Located within the lock mechanism housing 40 is an inner somewhat cylindrically shaped lock mechanism body 42, which includes those components necessary to lock the rotation restraining rod 28 within the housing, and preclude unauthorized extension of the same and to also hold the rotation restraining rod 28 in the extended position and preclude unauthorized pushing of the same back into the housing 26. Those components generally include two or more radially arranged spring-biased plungers 44, which are capable of being biased into radially aligned notches 46 formed within the rotation restraining rod 28, in the manner as best illustrated in FIGS. 2 and 3 of the drawings.

When the rotation restraining rod 28 is in the fully nested or retracted position as shown in FIG. 2, the plungers 44 will ride against the outer surface of the rotation restraining rod 28, as shown in FIG. 2. However, when the rotation restraining rod 28 is moved to the fully extended position as shown in FIG. 3, the plungers 44 will be spring-biased into the notches 46, by means of compression springs 48, as shown in FIG. 3. In this latter position, the plungers 44 will preclude any unauthorized pushing of the rotation restraining rod 28 back into the housing 26.

The plungers 44 are provided with a tapered lower face 50, as shown in FIGS. 2 and 3, and will fit within the notches 46 which are somewhat V-shaped. Thus, the plungers will automatically fall within the notches 46 when the notches 46 are aligned with the plungers 44. However, due to the fact that the plungers 44 have flat faces in engagement with the edges of the notches 46, as shown in FIG. 3, they cannot be pushed outwardly of the notches 46 by pushing against the outer end of the rotation restraining rod 28. Thus, the rotation restraining rod 28 is in the fully extended and locked position until a locking mechanism 52 is authorizedly opened.

The lock mechanism 52 is mechanically connected to the plungers 44 by means of rods 54 which extend between the springs 48, as also shown in FIGS. 2 and 3 of the drawings. Thus, when the lock mechanism 52 is opened, the plungers 44 are mechanically released from their positions within the notches 46, allowing the rod 28 to be pushed backwardly into the housing 26, as shown in FIG. 2. If the lock 52 is not opened, then the plungers 44 will preclude any pushing movement of the rotation restraining rod 28 back into the housing.

Also extending radially inwardly from the body 42 are a pair of abutments 56, and which are mounted on rods 58, as also shown in FIGS. 2 and 3. These rods 58 are likewise controlled by the lock mechanism 52. Thus, when the lock mechanism 52 is opened, the rods can be mechanically pushed radially outwardly so that the abutments 56 are located within recesses 60 formed within the body 42. In like manner, when the lock mechanism 52 is locked or closed, it will cause the abutments 56 to move radially inwardly to a position as shown in FIG. 2 of the drawings.

Mounted on the interior surface of the rotation restraining rod in radial alignment with the abutments 56, are stops 64. When the abutments 56 are shifted to the position as shown in FIG. 2, that is, in the unlocked position where the restraining rod 28 is nested within the housing, the stops 64 will abut against the abutments 56, thereby precluding extension of the rotation restraining rod 28. However, when the lock is opened, the abutments 56 will retract within the recesses 60 and to the position as shown in FIG. 3. In this case, the stops 64 will then be capable of shifting beyond the abutments 56 so that the rotation restraining rod 28 can be moved to the fully extended position as shown in FIG. 3.

The lock mechanism 52 is generally conventional in construction. This mechanism would include conventional tumblers which are moved by insertion and rotation of a key, much in a conventional manner. The key would be connected by linkage in the body 42 to both the plungers 44 and the abutments 56. Also mounted on the hub 20 of the steering wheel 22 is a key slot 66, and which is connected to the lock mechanism 52.

In accordance with the above-identified construction, when a user of the rotation restraining apparatus $R_1$ desires to open the apparatus, that is, to push the rotation restraining rod back within a nested position, the user merely inserts a key into the key slot 66. Turning of the key will cause retraction of the abutments 56, thereby moving the abutments out of the blocking position of the stops 64. This will free movement of the rotation restraining rod 28 to the extended position. Inasmuch as the rod 28 is spring-biased by the spring 38, it will shift to the left, as shown in FIG. 3, until it reaches a fully extended position. In that fully extended position, the plungers 44 will automatically drop into the aligned notches 46. As this occurs, backward pushing of the rotation restraining rod 28 into the housing is prevented. When the user has finished with a driving activity, he or she will merely insert a key again into the key slot 66 and rotate same. This will cause a release of the plungers 44 to drop into the notches 56. This will lock the rotation restraining rod in the extended position until the user again re-inserts the key into the key slot and turns same.

It should be understood that other types of locking mechanisms could be employed. Thus, for example, in place of a key slot on the hub 20, a push-button operated lock mechanism could be substituted therefor. The push-button lock mechanism may be electrically operated, in which case the lock mechanism would be designed to be electrically operable for causing movement of the plungers and abutments.

FIG. 4 illustrates an embodiment of a semi-automatic vehicle steering wheel rotation restraining apparatus $R_2$. Like reference numerals will be used to represent like components in the apparatus $R_2$. The rotation restraining apparatus $R_2$ is very similar in construction to the rotation restraining apparatus $R_1$. However, in this case, a solenoid operated locking mechanism 70 is employed. Moreover, and by reference to FIG. 4, it can be seen that the plungers 44 are operated by solenoids 72. Thus, when a key is inserted in the key slot 66 and rotated, the solenoid 72 will be de-energized and will allow the plungers 44 to shift by means of the springs 48 to the fully extended position, where they would fall within notches 46, similar to the arrangement as shown in FIG. 3. In like manner, the abutments 56 are also operated by solenoids 74 upon rotation of a key within the key slot 66. Thus, when a user removes a key from the key slot 66, the solenoid 74 will become automatically energized, causing retraction of the abutments 56. As this occurs, the stops 64 will then abut against the left-hand side of the abutments 56, and thereby hold the restraining rod 28 in the extended position.

When the user inserts the key in the key slot 66 in order to drive the vehicle, rotation of that key will automatically de-energize the solenoid 74 and will cause springs 76 disposed about the rods 58 to push the abutments radially inwardly. In this case, the abutments 56 will then be in a position where they will be engaged by the stops 64, thereby holding the rotation restraining rod 28 in the fully retracted or renested position within the housing 26. Moreover, rotation of the key within the key slot 66 will also cause energization of the solenoids 72, which will enable retraction of the plunger 44 out of the notch 46, and thereby allow a re-pushing of the rotation restraining rod 28 against the action of the compression spring 38 to a fully re-nested position.

It should also be understood that the rotation restraining apparatus $R_2$ could also be operated with a key pad or other form of lock in the place of the key-operated slot 66. Moreover, other moving components in the apparatus $R_2$ could be provided with solenoid mechanisms in order to provide powered movement of same. Thus, for example, a solenoid could also be provided at the right-hand end of the housing 26 in order to cause powered movement of the rotation restraining rod 28 outwardly of the housing 26.

FIGS. 5 and 6 illustrate one means of mounting the rotation restraining apparatus of the present invention, such as those apparatus $R_1$ and $R_2$, within the hub 20 of a steering wheel 22. Again, like reference numerals will be used to represent like components appearing in those apparatus, $R_1$ and $R_2$. Referring to FIG. 5, the underside of the steering wheel and the hub 20 is shown as being mounted to a conventional steering column 80. Moreover, located within the hub 20, is a rotation restraining apparatus R of the present invention.

In many of the new commercially available automotive vehicles, air bag mechanisms are located within the hub of the steering wheel. In this case, FIGS. 5 and 6 show one conventional form of air bag mechanism 82. This air bag mechanism 82 is only shown in a schematic block representation, since it does not form part of the present invention. However, the air bag mechanism 82 could be located in one side, such as the front side of the hub 20 of the steering wheel. In this case, the key-operated slot 66 is shown as being present on the front face of the hub 20. The rotation restraining apparatus R of the invention would be located within the rear portion of the hub, that is, the portion away from a driver of the vehicle. It has been found in connection with the present invention that there is sufficient room to provide for the rotation restraining apparatus, as well as the supplemental restraint air bag mechanism 82 within the hub of a vehicle steering wheel.

The rotation restraining apparatus R is located in the hub of the sterring wheel in a position so that the restraining rod 28 will extend through an opening 83 in the steering wheel. In this way the sterring wheel will also provide a restraint against any bending force applied to the rod 28.

In those vehicles which are not provided with a sufficient space to accommodate the rotation restraining apparatus R, it is generally a simple matter to remove one steering wheel 22 from the steering column 80, and secure another steering wheel in its place on the steering column 80. The latter steering wheel could be fully provided with the rotation restraining apparatus mounted therein. Thus, the present invention is operable with new vehicles, and can be automatically constructed within the steering wheel. Otherwise, a substitute steering wheel can be mounted on vehicles which do not include the rotation restraining apparatus.

One of the important aspects in connection with the present invention is that the biasing spring 38 does not push the restraining rod 28 outwardly of the hub with any substantial amount of force. Moreover, and for the safety of passengers in the vehicle, as well as for the driver of the vehicle, the biasing spring 38 only pushes the rotation restraining rod 28 outwardly of the hub 20 for a relatively short distance, as, for example, about six inches or so. This will allow the user to merely hand grasp the extended restraining rod and pull the same to its fully extended position. In this way, by precluding an automatic sudden extension, injury to passengers or even to the legs of the driver, can be precluded by a rod which would otherwise pushed outwardly with a substantial amount of force.

In the actual construction of a hub in the steering wheel to accommodate the rotation restraining apparatus, a cavity would be molded within the actual hub 20. Thus, the hub could be formed of a clam-shell construction where two halves of the hub are separated, and which allows insertion of those components necessary into the hub. It should also be understood that a blinking light, such as a LED light, could be mounted on the key pad or adjacent to the key slot on the steering wheel, or elsewhere in order to indicate the status of the position of the rotation restraining rod. This would also be used to inform potential thieves or unauthorized users of the fact that there is a security device on the vehicle itself. In addition, it should be understood that the ignition could be wired to the rotation restraining apparatus, and particularly the rotation restraining apparatus $R_1$, so as to preclude starting of the ignition if the restraining arm were in the extended or deployed position.

The rotation restraining apparatus of the present invention are also designed so that it is difficult, if not virtually impossible, for a thief or other unauthorized user, to grasp the rotation restraining rod 28 and pull the same outwardly of the housing for purposes of breaking the rod. Further, for this purpose, the rod could be formed of case-hardened steel to preclude easy fracturing of the same. In fact, the rod 28 can be designed so that a 250 pound individual with strong arms could not bend the same or break the rod.

The clam-shell components of the hub could be secured together with security-type screws, so that a thief or other unauthorized user could not easily separate the clam-shell components for exposing the interior components of the steering wheel restraining apparatus. In addition, where electrically operable components are employed, they can be wired to be in the fail-safe state. Thus, for example, where a driver is in the position of driving a vehicle, in the event of a sudden power failure of that vehicle, the restraining bar would be automatically locked in the retracted position, so that it would not be automatically extended outwardly and interfere with a steering of the vehicle to a stopped position.

FIGS. 7–9 illustrate another embodiment of a type of semi-automatic vehicle steering wheel rotation restraining apparatus $R_3$, and which also relies upon an electromechanical operation. The vehicle steering wheel rotation restraining apparatus $R_3$ also generally comprises an outer housing 90, which is similar to the outer housing 26 in the apparatus $R_1$, and which retains a shiftable rotation restraining rod 92, the latter of which is similar to the rotation restraining rod 28.

The housing 90 is similarly provided with an open end 94, allowing extension of the rotation restraining rod 92 to a position as shown in FIG. 9 and is also capable of being retracted to the nested position as shown in FIG. 7.

Mounted on the exterior of the housing 90 is a solenoid 96 which operates a plunger 98, and the latter of which is capable of being received within a first radially aligned notch 100 formed in the rotation restraining rod 92, and in proximity to an end thereof which is capable of being extended beyond the housing 90. When the solenoid 96 is energized, it will cause retraction of the plunger 98, and when de-energized, will allow extension of the plunger into the recess 100.

Energization of the solenoid will cause retraction of the plunger 98, as aforesaid, and a compression spring 102 located between a closed end of the housing 90 and a corresponding end of the rotation restraining rod 92, will force the rod 92 outwardly from its nested position to a fully extended position, as shown in FIG. 9 of the drawings. The rod 92 is capable of fitting within a second notch or recess 104 when the rod is located in its fully extended position, as best shown in FIG. 9 of the drawings. Thus, when in the extended position or in the retracted position, the plunger 98 will always hold the rotation restraining rod 92 in that selected position.

In order to enable a sliding movement of the rotation restraining rod 92 within the bore of the housing 90, a teflon coating or similar friction-reducing coating 108 is provided. In like manner, and in order to maintain proper rotational orientation of the rotation restraining rod 92 with respect to the housing, a key and key way arrangement could be provided. Further, this arrangement could be provided on the other vehicle steering wheel rotation restraining apparatus of the present invention.

A sensor arm 110 is mounted on the solenoid 96, and is capable of sensing the position of the rotation restraining rod 92. The sensing arm 110 extends inwardly into the bore of the housing 90 through an opening 112, as best shown in FIGS. 7 and 9 of the drawings. This sensing arm 112 will engage an abutment 114 located on the surface of the rotation restraining rod 92, as best shown in FIGS. 7 and 9 of the drawings. As the sensing arm 110 engages the abutment 114, a signal is initiated to the solenoid 96 to again cause a de-energization of the solenoid 96, allowing extension of the plunger 98, so that the latter can be introduced into the second notch 104, and thereby hold the rod 92 in an extended position.

In like manner, when it is necessary to retract the rod 92, the user of the apparatus $R_3$ will merely either operate a key mechanism or a key pad mechanism, as previously described, and this will, in turn, cause energization of the solenoid 96, to cause removal of the plunger 98 from the notch 104. As this occurs, the user can merely push the rod 92 back into the housing 90 against the action of the spring 102. At this point, and when the sensor arm 110 passes the abutment 114, the solenoid 96 will be de-energized, causing the plunger to shift back into the notch 100.

Any locking mechanism may be provided and connected to the solenoid 96. This locking mechanism, when operated, will cause either energization or de-energization of the solenoid. Again, that locking mechanism can be right on the hub of the steering wheel or otherwise, it can be mounted on the dashboard of the vehicle or in any other desired location. Furthermore, the key operated mechanism could be substituted by a simple switch which may be hidden under the dashboard of the vehicle, if desired.

FIGS. 10–12 illustrate a fully automatic vehicle steering wheel rotation restraining apparatus $R_4$, which is also constructed in accordance with and embodies the present invention. The vehicle rotation restraining apparatus $R_4$ also includes an outer housing 120, having an open end 122, to receive a shiftable rotation restraining rod 124. Again, the housing 120 and the rotation restraining rod 124 are similar in construction to the previously described housing 26 and rotation restraining rod 28.

One portion of the annular surface of the rotation restraining rod 124 is provided with a rack segment 126, and which is adapted for meshing engagement with a pinion gear 128, the latter of which may be journaled within a portion of the side wall of the housing 120. By reference to FIGS. 10 and 11, it can be seen that the pinion gear is disposed in meshing engagement with the rack 126. The pinion gear 128 is connected to and rotatable by an electric motor 130 through a drive shaft 132, as best shown in FIG. 12. Moreover, the pinion gear fits within a recess or notch 134, also located in the side wall of the housing, as best shown in FIGS. 10 and 11.

The motor 130 is preferable bi-directional, and when rotated in one direction, will cause an extension of the rotation restraining rod 124 from its nested position in the housing 120 to an extended position, as shown in FIG. 11 of the drawings. Moreover, in order to provide a mechanical advantage against someone attempting to manually pull the rod 124 outwardly of the housing or otherwise push the same back into the housing, a gearing arrangement could be employed so that a thief or other unauthorized individual could not push against the same. In any event, when the rod 124 is extended, if a thief or other unauthorized individual attempts to push the same back into the housing, he or she would have to push against the motor 130, while in a de-energized state, which would require a substantial amount of force. In addition, and if desired, other lock mechanisms of the type shown in the other rotation restraining apparatus, could be employed.

In order to provide safety, the electric motor 130 is connected to a suitable controller 136, as shown in FIG. 12. In this case, the controller 136 would be operable to immediately cause a stopping movement of the motor 130 if the rotation restraining rod encountered an obstruction. Obstruction-sensing mechanism of this type are typically found in the prior art in, for example, gate operators, elevator door mechanisms, and the like. One such control system which could be used for this purpose is shown in U.S. Pat. No. 5,230,179, and which automatically causes a cessation of movement and a retraction if a gate or other member contacts an obstruction.

It should be understood in connection with the present invention that it would be possible to employ an elongate row of notches on one segment of the surface of the rotation restraining rod 124, along with a star wheel which is rotated by the motor 130. Other types of drive mechanisms could also be employed for this purpose.

A motor deploy switch, such as a key-operated switch, a push-button operated switch, or the like, would also be employed for this purpose. Again, this switch may adopt the form of a lock, as previously described, or it may adopt the form of a simple switch. A push-button operated pad could be located on the hub of the steering wheel for this purpose. Otherwise, the switch could be incorporated directly in the ignition switch of the vehicle. Thus, and for this purpose, when the ignition of the vehicle is turned on, the rotation restraining rod 124 would automatically retract into a nested position within the hub of the steering wheel. In like manner, when the ignition is turned off, the rotation restraining rod would automatically extend to the extended position.

The motor could be operated or otherwise a gear mechanism could be employed to ensure that the rotation restraining rod 124 is moved slowly out of the housing 120 in order to ensure that there is no unintentional contact with a passenger of the vehicle or otherwise with the legs of the driver of the vehicle. In addition, position switches could be located with respect to the steering wheel, and which would preclude operation of the apparatus if the wheel was not located in a desired position. Thus, for example, if the wheel were rotated so that the rotation restraining rod 124 would extend into a leg of a driver, the position switch would preclude operation of the apparatus.

It is also possible to ensure fail-safe devices in any of the aforesaid vehicle steering wheel rotation restraining apparatus. In this case, the solenoids would be operated so as to ensure safe driving during a condition where a driver may be in the vehicle. In like manner, particularly, the controller 136 could be constructed so as to preclude any operation of the motor to cause a retraction of the rod 124 in the event of tampering.

Thus, there has been illustrated and described a unique and novel vehicle steering wheel rotation restraining apparatus which can be provided directly in the hub of a steering wheel, and which thereby avoids the need of an externally-mountable apparatus. The present invention thereby fulfills all of the objects and advantages which have been sought therefor. It should be understood that many changes, modifications, variations and other uses and applications will become apparent to those skilled in the art after considering the specification and the accompanying drawings. Therefore, any and all such changes, modifications, variations, and other uses and applications which do not depart from the spirit and scope of the invention are deemed to be covered by the invention.

Having thus described the invention, what I desire to claim and secure by Letters Patent is:

1. An automotive vehicle steering wheel rotation restraining apparatus with a rod capable of being retained within a nested position in a hub of a vehicle steering wheel to a position where it extends beyond a rim of the steering wheel to restrain turning movement of the steering wheel and thereby reduce theft of the vehicle, said apparatus comprising:
   a) an elongate housing;
   b) a single elongate rod contained within said housing and (1) extending outwardly of the housing and beyond a steering wheel with which the apparatus is used to a position which limits rotatable movement of the steering wheel and also to (2) a retracted position inwardly within said housing to permit rotation of the steering wheel;
   c) first electrically energizable solenoid operable restraining means for locking the rod in the extended position when extended outwardly of the housing to restrain turning movement of the steering wheel and locking the rod in a position within the housing when retracted;
   d) second electrically energizable solenoid operable restraining means for locking the rod in the retracted position within the housing to permit turning movement of the steering wheel; and
   e) locking means for operating the first and second restraining means when the locking means is authorizedly opened and closed.

2. The vehicle steering wheel restraining apparatus of claim 1 further characterized in that the restraining means comprises a first restraining pin means for extending into a first recess in the rod and locking the restraining rod in the extended position and a second and separate restraining pin means for extending into a second recess in the rod and locking the restraining rod in the steering wheel.

3. The vehicle steering wheel restraining apparatus of claim 1 further characterized in that said second recess is a radial recess in said rod and said second restraining means comprises said second pin which extends into said second recess in said rod, and said first recess is an angular notch formed in said rod and a first restraining pin has a tapered end to fit within the notch of said rod and holds same in an extended position.

4. The vehicle steering wheel restraining apparatus of claim 1 further characterized in that there is an oppositely diposed pair of said first solenoid openable restraining means and an oppositely disposed pair of said second solenoid operable restraining means.

5. The vehicle steering wheel restraining apparatus of claim 2 further characterized in that said locking means is a manually turnable key operable locking means.

6. The vehicle steering wheel rotation retraining apparatus of claim 1 further characterized in that said apparatus comprises a tubular shell which receives the rod.

7. A steering wheel assembly for an automotive vehicle having means for restraining rotational movement when not in use, said steering wheel assembly comprising:
   a) a steering wheel hub and an outer arcuate ring portion secured thereto;
   b) an elongate tubular channel in said hub;
   c) an elongate steering wheel restraining rod located in said elongate channel and capable of movement from a nested position within said hub to a rotation restraining position when it extends beyond said ring portion and thereby limits rotational movement thereof;
   d) a rack segment located on said restraining rod;
   e) gear means disposed in meshing engagement with said rack segment and causing movement of said restraining rod when said gear means is rotated; and
   f) drive means coupled to said gear means for allowing said rod to be retracted into said hub and allowing said rod to move to the extended position.

8. The steering wheel assembly for an automotive vehicle of claim 7 further characterized in that a control means is operatively connected to said drive means for driving the restraining rod to the extended position and for retracting the restraining rod in the steering wheel.

9. A steering wheel rotation restraining assembly for use with an automotive vehicle having means for restraining rotational movement of a steering wheel when not in use, said steering wheel rotation restraining assembly comprising:
   a) a steering wheel with an arcuate outer ring portion;
   b) a wheel hub extending across and connecting sections of said ring portion;
   c) said steering wheel hub being comprised of a pair of shells which are secured together in a clam shell construction and which form an interior compartment in said wheel hub;

d) an elongate steering wheel restraining rod located in said shells and capable of movement from a nested position within the shells to a rotation restraining position what extends beyond the ring portion and thereby limits rotational movement thereof;

e) a restraining rod operating mechanism fully located in said interior compartment which is capable of locking said restraining rod in the nested position in the shells and in the rotation restraining position when extended outwardly therefrom, thereby allowing said rotation restraining assembly to be used in existing vehicles.

10. The steering wheel rotation restraining assembly of claim 9 further characterized in that said assembly comprises locking means for allowing said rod in said hub and allowing said rod to move to an extended position.

11. An automotive vehicle steering wheel rotation restraining apparatus with a rod capable of being retained within a nested position in a hub of a vehicle steering wheel to a position where it extends beyond a rim of the steering wheel to restrain turning movement of the steering wheel and thereby reduce theft of the vehicle, said apparatus comprising:

a) an elongate housing;

b) a single elongate rod contained within said housing and (1) extending outwardly of the housing and beyond a steering wheel with which the apparatus is used to a position which limits rotatable movement of the steering wheel and also to (2) a retracted position inwardly within said housing to permit rotation of the steering wheel;

c) first restraining means for automatically locking the rod in the extended position when extended outwardly of the housing to restrain turning movement of the steering wheel;

d) second key operated manually operable restraining means for locking the rod in the retracted position within the housing to permit turning movement of the steering wheel; and e) a single locking means for operating the first and second restraining means when the locking means is authorizedly opened and closed.

12. The vehicle steering wheel restraining apparatus of claim 11 further characterized in that the restraining means comprises a first restraining pin means for extending into a first recess in the rod and locking the restraining rod in the extended position and a second and separate restraining pin means for extending into a second recess in the rod and locking the restraining rod in the steering wheel.

13. The vehicle steering wheel restraining apparatus of claim 12 further characterized in that said second recess is a radial recess in said rod and said restraining means comprises said second pin which extends into said second recess in said rod, and said first recess is an annular notch formed in said rod and said first restraining pin has a tapered end to fit within the notch of said rod and hold same in an extended position.

14. The vehicle steering wheel restraining apparatus of claim 11 further characterized in that there is an oppositely disposed pair of said first solenoid openable restraining means and an oppositely disposed pair of said second key operable restraining means.

15. The vehicle steering wheel restraining apparatus of claim 13 further characterized in that said locking means is a manually turnable key operable locking means.

16. The vehicle steering wheel rotation retraining apparatus of claim 11 further characterized in that said apparatus comprises a tubular shell which receives the rod.

17. An automotive vehicle steering wheel rotation restraining apparatus with a rod capable of being retained within a nested position in a hub of a vehicle steering wheel to a position where it extends beyond a rim of the steering wheel to restrain turning movement of the steering wheel and thereby reduce theft of the vehicle, said apparatus comprising:

a) an elongate housing;

b) a single elongate rod contained within said housing and (1) extending outwardly of the housing and beyond a steering wheel with which the apparatus is used to a position which limits rotatable movement of the steering wheel and also to (2) a retracted position inwardly within said housing to permit rotation of the steering wheel;

c) a single solenoid operable restraining means for locking the rod in the extended position when extended outwardly of the housing to restrain turning movement of the steering wheel;

d) a single solenoid operable restraining means for locking the rod in the retracted position within the housing to permit turning movement of the steering wheel;

e) a pair of recesses receiving a pin operable by the restraining means to lock the rod in the extended and retracted positions;

f) an abutment on the rod;

g) a sensing arm operable with the restraining means to detect a position of the rod and cause operation of the restraining means; and h) locking means for operating the first and second restraining means when the locking means is authorizedly opened and closed.

18. The vehicle steering wheel restraining apparatus of claim 17 further characterized in that said locking means is a manually turnable key operable locking means.

19. An automotive vehicle steering wheel rotation restraining apparatus with a rod capable of being retained within a nested position in a hub of a vehicle steering wheel to a position where it extends beyond a rim of the steering wheel to restrain turning movement of the steering wheel and thereby reduce theft of the vehicle, said apparatus comprising:

a) an elongate housing;

b) a single elongate rod contained within said housing and (1) extending outwardly of the housing and beyond a steering wheel with which the apparatus is used to a position which limits rotatable movement of the steering wheel and also to (2) a retracted position inwardly within said housing to permit rotation of the steering wheel;

c) first rod operating means for automatically moving and locking the rod in the extended position outwardly of the housing to restrain turning movement of the steering wheel;

d) second rod operating means for automatically retracting and locking the rod in the retracted position within the housing to permit turning movement of the steering wheel; and e) a single locking means for operating the first and second rod operating means when the locking means is authorizedly opened and closed.

20. The vehicle steering wheel restraining apparatus of claim 19 further characterized in that the first and second rod operating means comprises a means connected to the electrical system of the vehicle.

21. A steering wheel rotation restraining assembly for use with an automotive vehicle having an electrically operable ignition system which controls operation of an engine of that automotive vehicle, and where said restraining assembly restrains rotational movement of a steering wheel when not in use, said steering wheel rotation restraining assembly comprising:
   a) a steering wheel with an arcuate outer ring portion;
   b) a wheel hub extending across and connecting sections of said ring portion;
   c) an elongate steering wheel restraining rod located in said wheel hub and capable of movement from a nested position within the hub to a rotation restraining position what extends beyond the ring portion and thereby limits rotational movement thereof;
   d) a restraining rod operating mechanism fully located in an interior compartment of said wheel hub which is capable of locking said restraining rod in the nested position in the hub when the vehicle is in use and in the rotation restraining position when extended outwardly therefrom; and
   e) a key pad having manually operable push button switches mounted in said vehicle for controlling operation of the restraining rod operating mechanism and allowing for retraction of the rod in the hub when a proper code is introduced through the manually operable push button switches.

22. The steering wheel rotation restraining assembly of claim 20 further characterized in that said key pad is mounted on the hub of the steering wheel.

23. The steering wheel rotation restraining assembly of claim 20 further characterized in that said restraining apparatus is connected to the ignition system of the vehicle to simultaneously operate the assembly causing retraction of the rod when the ignition is operated.

* * * * *